United States Patent
Ito et al.

(10) Patent No.: US 11,518,350 B2
(45) Date of Patent: Dec. 6, 2022

(54) DRIVING ASSISTANCE APPARATUS

(71) Applicant: Toyota Jidosha Kabushiki Kaisha, Toyota (JP)

(72) Inventors: Shogo Ito, Shizuoka-ken (JP); Kohei Tochigi, Susono (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 384 days.

(21) Appl. No.: 16/720,315

(22) Filed: Dec. 19, 2019

(65) Prior Publication Data
US 2020/0198600 A1    Jun. 25, 2020

(30) Foreign Application Priority Data
Dec. 25, 2018    (JP) .............................. JP2018-240729

(51) Int. Cl.
*B60T 7/12* (2006.01)
*B60T 8/17* (2006.01)
(Continued)

(52) U.S. Cl.
CPC .................. *B60T 7/22* (2013.01); *B60T 7/12* (2013.01); *B60T 8/172* (2013.01); *B60T 8/174* (2013.01); *B60T 2201/022* (2013.01)

(58) Field of Classification Search
CPC ... B60T 7/12; B60T 8/17; B60T 8/172; B60T 8/174; B60T 8/3265; B60T 8/3275; B60T 2201/022; B60T 2201/03; B30W 30/09
(Continued)

(56) References Cited

U.S. PATENT DOCUMENTS 8,554,436 B2 * 10/2013 Kobayashi ............ B60W 50/16
                                                    701/70
9,187,067 B2 * 11/2015 Breu ............... B60W 30/18036
(Continued)

FOREIGN PATENT DOCUMENTS

CN       105774772 B  *  8/2018  ................ B60T 7/12
JP       2006-175943 A     7/2006
(Continued)

OTHER PUBLICATIONS

James Marson, Katy Ferris, Jill Dickinson, an abstract of "The Automated and Electric Vehicles Act 2018 Part 1 and Beyond: A Critical Review", Statute Law Review, vol. 41, Issue 3, Oct. 2020, pp. 395-416, https://doi.org/10.1093/slr/hmz021 (Year: 2020).*

*Primary Examiner* — Cuong H Nguyen
(74) *Attorney, Agent, or Firm* — Dinsmore & Shohl LLP

(57) ABSTRACT

A driving assistance apparatus is configured to provide deceleration assistance of decelerating a host vehicle, and is configured to end the deceleration assistance on condition that a pedal operation is performed by a driver while the deceleration assistance is provided. The driving assistance apparatus is provided with: an estimator configured to estimate an operation intention of the driver associated with an operation of a brake pedal, on condition that the brake pedal is operated by the driver while the deceleration assistance is provided; and a controller programmed to delay timing in which a deceleration assistance amount associated with the deceleration assistance becomes zero at the end of the deceleration assistance, if the estimated operation intention is caused by the target, in comparison with that if the estimated operation intention is not caused by the target.

18 Claims, 3 Drawing Sheets

(51) Int. Cl.
  *B60T 7/22* (2006.01)
  *B60T 8/172* (2006.01)
  *B60T 8/174* (2006.01)
(58) Field of Classification Search
  USPC .......................................................... 701/70
  See application file for complete search history.

(56) References Cited

U.S. PATENT DOCUMENTS

| | | | | |
|---|---|---|---|---|
| 9,500,155 | B2* | 11/2016 | Matsunaga | B60T 7/042 |
| 10,710,589 | B2* | 7/2020 | Tashiro | B60W 10/06 |
| 2005/0124458 | A1* | 6/2005 | Iwatsuki | B60W 10/184 |
| | | | | 477/34 |
| 2005/0234626 | A1* | 10/2005 | Shiiba | B60W 10/18 |
| | | | | 701/70 |
| 2012/0022759 | A1* | 1/2012 | Inoue | B60T 7/22 |
| | | | | 701/70 |
| 2013/0024090 | A1* | 1/2013 | Minase | B60W 50/10 |
| | | | | 701/102 |
| 2013/0041564 | A1* | 2/2013 | Doi | B60W 50/087 |
| | | | | 701/70 |
| 2013/0110369 | A1* | 5/2013 | Breu | B60W 30/18109 |
| | | | | 701/70 |
| 2013/0144465 | A1* | 6/2013 | Shida | G06F 17/00 |
| | | | | 701/1 |
| 2013/0173134 | A1* | 7/2013 | Terasaka | B60T 17/22 |
| | | | | 701/74 |
| 2013/0179053 | A1* | 7/2013 | Matsunaga | B60W 10/188 |
| | | | | 701/112 |
| 2013/0304317 | A1* | 11/2013 | Takiguchi | B60K 26/021 |
| | | | | 701/36 |
| 2016/0059852 | A1* | 3/2016 | Yamakado | B60W 10/08 |
| | | | | 701/41 |
| 2016/0194000 | A1* | 7/2016 | Taki | B60W 30/08 |
| | | | | 701/70 |
| 2016/0221549 | A1* | 8/2016 | Tanase | B60T 8/172 |
| 2016/0264135 | A1* | 9/2016 | Yamakado | B60W 10/18 |
| 2016/0347181 | A1* | 12/2016 | Yamakado | B60L 15/20 |
| 2017/0057513 | A1* | 3/2017 | Ohashi | B60W 30/18009 |
| 2017/0341612 | A1* | 11/2017 | Ohmori | B60W 10/06 |
| 2018/0050673 | A1* | 2/2018 | D'sa | B60T 7/22 |
| 2018/0099648 | A1* | 4/2018 | Won | B60T 8/171 |
| 2018/0099649 | A1* | 4/2018 | Kim | B60T 13/686 |
| 2018/0141441 | A1* | 5/2018 | Kim | B60T 8/28 |
| 2018/0257667 | A1* | 9/2018 | Yoshii | G05D 1/0265 |
| 2018/0265081 | A1* | 9/2018 | Yoneda | B60W 40/068 |
| 2018/0297475 | A1* | 10/2018 | Zhao | B60L 7/26 |
| 2019/0023241 | A1* | 1/2019 | Kumagai | B60T 8/172 |
| 2019/0039586 | A1* | 2/2019 | Suzuki | B60T 8/00 |
| 2019/0113930 | A1* | 4/2019 | Mimura | B60W 10/20 |
| 2019/0283772 | A1* | 9/2019 | Ishisaka | G05D 1/0061 |
| 2019/0381895 | A1* | 12/2019 | Shindo | B60T 7/12 |
| 2020/0130673 | A1* | 4/2020 | Suzuki | B60W 20/19 |
| 2020/0189576 | A1* | 6/2020 | Ikezawa | B60T 7/22 |
| 2021/0213918 | A1* | 7/2021 | Chen | B60T 8/172 |
| 2021/0213920 | A1* | 7/2021 | Frea | B60L 7/24 |

FOREIGN PATENT DOCUMENTS

| | | | | |
|---|---|---|---|---|
| JP | 2008296886 A | * | 12/2008 | ............ B60R 21/00 |
| JP | 4743961 B2 | * | 8/2011 | ............ B60T 13/662 |
| JP | 2020097337 A | * | 6/2020 | ................ B60T 7/12 |
| JP | 2020168388 A | * | 10/2020 | ............ A61L 27/34 |
| WO | WO-9920508 A1 | * | 4/1999 | ........ B60K 31/0008 |
| WO | WO-02057123 A1 | * | 7/2002 | ............. B60T 8/172 |
| WO | WO-2012042341 A1 | * | 4/2012 | ............ B60T 13/662 |

* cited by examiner

DRIVING ASSISTANCE APPARATUS

CROSS-REFERENCE TO RELATED APPLICATIONS

This application is based upon and claims the benefit of priority of the prior Japanese Patent Application No. 2018-240729, filed on Dec. 25, 2018, the entire contents of which are incorporated herein by reference.

BACKGROUND

1. Technical Field

Embodiments of the present disclosure relate to a driving assistance apparatus, and particularly relate to a driving assistance apparatus configured to provide deceleration assistance.

2. Description of the Related Art

For this type of apparatus, for example, as disclosed in Japanese Patent Application Laid Open. No. 2006-175943 (Patent Literature 1), a control performed by a driving assistance apparatus independently of an operation by a driver of a vehicle is released or canceled due to the driver's operation.

If a deceleration assistance control is released due to an operation of a brake pedal performed by the driver while the deceleration assistance control is performed by the driving assistance apparatus, the driver may feel discomfort depending on how to release the deceleration assistance control, which is technically problematic.

SUMMARY

In view of the aforementioned problem, it is therefore an object of embodiments of the present disclosure to provide a driving assistance apparatus that can prevent the driver from feeling discomfort when the deceleration assistance control is released due to the operation of the brake pedal by the driver.

The above object of embodiments of the present disclosure can be achieved by a driving assistance apparatus configured to provide deceleration assistance of decelerating a host vehicle when a predetermined assistance condition including requirements associated with a target, which is ahead of the host vehicle on a course thereof, is satisfied, and configured to end the deceleration assistance on condition that a pedal operation is performed by a driver of the host vehicle while the deceleration assistance is provided, the driving assistance apparatus provided with: an estimator configured to estimate an operation intention of the driver associated with an operation of a brake pedal, on condition that the brake pedal is operated by the driver while the deceleration assistance is provided; and a controller programmed to delay timing in which a deceleration assistance amount associated with the deceleration assistance becomes zero at the end of the deceleration assistance, if the estimated operation intention is caused by the target, in comparison with that if the estimated operation intention is not caused by the target.

DETAILED DESCRIPTION OF EMBODIMENT

A driving assistance apparatus according to an embodiment of the present disclosure will be explained with reference to FIG. 1 to FIG. 3B.

(Configuration)

Figure 1:
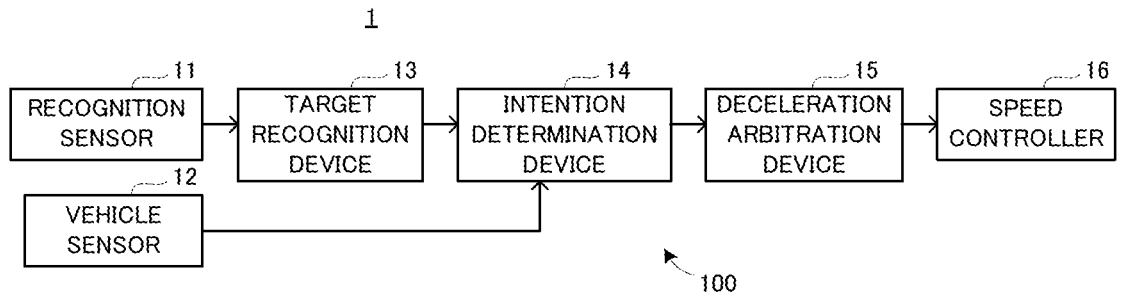
FIG. 1 is a block diagram illustrating a configuration of a driving assistance apparatus according to an embodiment.

A configuration of the driving assistance apparatus according the embodiment will be explained with reference to FIG. 1. FIG. 1 is a block diagram illustrating the configuration of the driving assistance apparatus according to the embodiment.

In FIG. 1, a driving assistance apparatus 100 is mounted on a vehicle 1. The driving assistance apparatus 100 is configured to perform a driving assistance control of assisting a driver of the vehicle 1 in driving. In the embodiment, an example of the driving assistance control includes a deceleration assistance control.

The driving assistance apparatus 100 is provided with a recognition sensor 11, a vehicle sensor 12; a target recognition device 13, an intention determination device 14, a deceleration arbitration device 15, and a speed controller 16, so as to realize the deceleration assistance control.

The recognition sensor 11 is provided with a device configured to recognize an external situation of the vehicle 1, such as, for example, a millimeter wave radar and a camera. The vehicle sensor 12 is provided with a device configured to detect a state of the vehicle 1, such as, for example, a vehicle wheel speed sensor, an accelerator pedal sensor, a brake pedal sensor, and a steering angle sensor. A detailed explanation of the recognition sensor 11 and the vehicle sensor 12 will be omitted because various existing aspects can be applied thereto.

The target recognition device 13 is configured to recognize a target of the deceleration assistance control, on the basis of an output of the recognition sensor 11. Examples of the target are: an obstacle, such as, for example, another vehicle, a pedestrian, and a structure; something that restricts travel of the vehicle 1, such as, for example, a road sign, a red light, and a stop line; and a road structure, such as, for example, an intersection and a curve. In other words, the target of the deceleration assistance control means something that requires the vehicle 1 to decelerate or stop.

Now, an explanation will be given to conditions that allow the deceleration assistance control to be performed. In the embodiment, the deceleration assistance control may be performed when the following three conditions are satisfied: (i) the target of the deceleration assistance control is recognized by the target recognition device 13, (ii) a distance between the vehicle 1 and the recognized target is less than or equal to a first predetermined distance, and (iii) the driver does not step on any of an accelerator pedal and a brake pedal. Thus, when the driver steps on the accelerator pedal or the brake pedal during execution of the deceleration assistance control, the deceleration assistance control is released (i.e., ended), because the aforementioned condition (iii) is not satisfied.

When the driver steps on the brake pedal during execution of the deceleration assistance control, the deceleration assistance control is released. Thus, a deceleration assistance amount associated with the deceleration assistance control (hereinafter referred to "system deceleration" as occasion demands) decreases, whereas deceleration caused by an operation of the brake pedal (hereinafter referred to "driver deceleration" as occasion demands) increases as the driver further steps on the brake pedal. Thus, an actual change in the deceleration of the vehicle 1 may be less than a change in the deceleration of the vehicle 1 that is expected from a step amount of the brake pedal. Therefore, if the driver steps on the brake pedal during execution of the deceleration assistance control, the driver may feel so-called G loosing (i.e., feeling of insufficient deceleration even though the brake pedal is stepped on).

Nevertheless, the driver's feeling of so-called G loosing is not a problem in many cases. On the other hand, when the driver steps on the brake pedal with an intention of stopping the vehicle 1 at a certain target position, there may be a situation in which the vehicle 1 cannot be stopped at the target position due to the so-called G loosing. Specifically, for example, if the driver feels that it is hardly possible to stop the vehicle 1 at the target position due to the so-called G loosing and further steps on the brake pedal, then, the vehicle 1 ends up decelerating more than necessary. This may make it impossible to stop the vehicle 1 at the target position.

Thus, on the driving assistance apparatus 100, the driver's intention is determined by the intention determination device 14, and on the basis of a determination result of the intention determination device 14, a method of arbitrating between the system deceleration and the driver deceleration when the deceleration assistance control is released, is changed by the deceleration arbitration device 15.

The intention determination device 14 is configured to determine whether or not the driver has an intention to stop the vehicle 1 at a target position (e.g. a stop line, etc.) caused by the target of the deceleration assistance control (hereinafter referred to as a "deceleration intention towards the target position" as occasion demands), on the basis of information associated with the target of the deceleration assistance control recognized by the target recognition device 13 (e.g., a type of the target, a distance between the vehicle 1 and the target, a relative speed of the target to the vehicle 1, etc.), and an output of the vehicle sensor 12 (e.g., a speed of the vehicle 1, an operation amount of the brake pedal, etc.), when the driver steps on the brake pedal during execution of the deceleration assistance control.

The intention determination device 14 is configured to determine that the driver has the deceleration intention towards the target position, if the distance between the vehicle 1 and the target of the deceleration assistance control when the driver steps on the brake pedal is less than or equal to a second predetermined distance, wherein the second predetermined distance is less than the first predetermined distance. The intention determination device 14 may determine whether or not the driver has the deceleration intention towards the target position for example, on the basis of the speed of the vehicle 1, a visual line direction of the driver, a braking gradient, which is obtained from the step amount and a step speed of the brake pedal, or the like, in addition to the distancer between the vehicle 1 and the target of the deceleration assistance control.

The deceleration arbitration device 15 is configured to change the method of arbitrating between the system deceleration and the driver deceleration when the deceleration assistance control is released, on the basis of the determination result of the intention determination device 14. A specific explanation will be described later. The deceleration arbitration device 15 is further configured to arithmetically operate target acceleration/deceleration associated with the vehicle 1, on the basis of the system deceleration and the driver deceleration.

The speed controller 16 is configured to perform a deceleration control on the vehicle 1 (i.e., to control a not-illustrated brake system mounted on the vehicle 1) so as to realize the target acceleration arithmetically operated by the deceleration arbitration device 15.

(Operations)

Next, with reference to a flowchart in FIG. 2, an explanation will be given to operations of the driving assistance apparatus 100.

Figure 2:
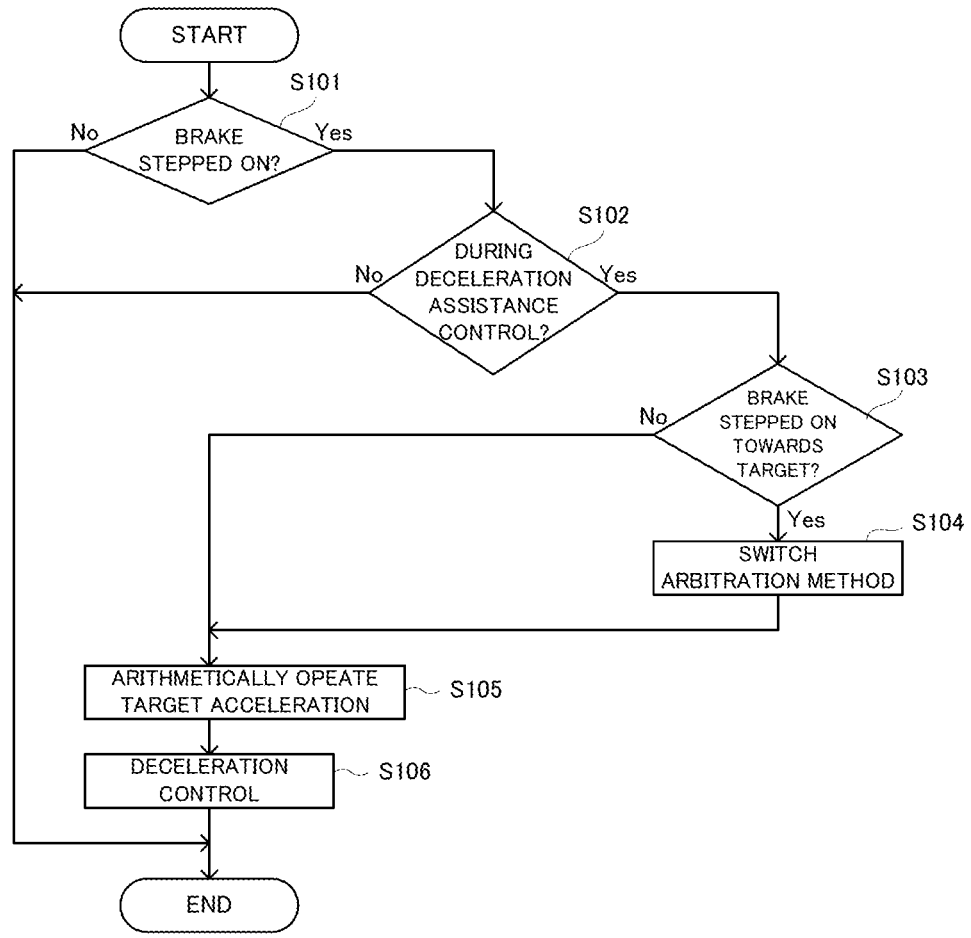
FIG. 2 is a flowchart illustrating operations of the driving assistance apparatus according to the embodiment.

In FIG. 2, the intention determination device 14 determines whether or not the driver is stepping on the brake pedal on the basis of the output of the vehicle sensor 12 (step S101). In the step S101, if it is determined that the driver is not stepping on the brake pedal (the step S101: No), the operations illustrated in FIG. 2 are temporarily ended. Then, after a lapse of a predetermined time (e.g., several ten milliseconds to several hundred milliseconds, etc.), the step S101 is performed again. In other words, the operations illustrated in FIG. 2 are repeated with a period corresponding to the predetermined time.

In the step S101, if it is determined that the driver is stepping on the brake pedal (the step S101: Yes), the intention determination device 14 determines whether or not the deceleration assistance control is being performed (step S102). In the step S102, if it is determined that the deceleration assistance control is not being performed (the step S102: No), the operations illustrated in FIG. 2 are temporarily ended.

In the step S102, if it is determined that the deceleration assistance control being performed (the step S102: Yes), the intention determination device 14 determines whether or not the driver has a deceleration intention towards the target position (step S103).

Figure 3A:
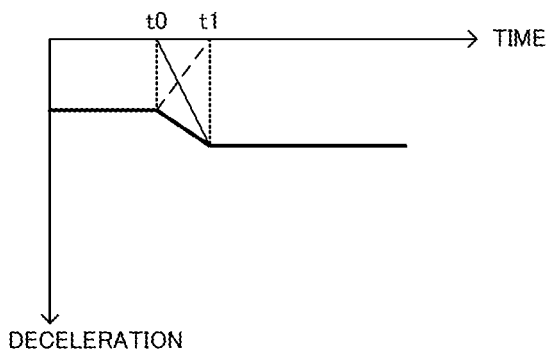
FIG. 3A is a graph illustrating an arbitration method according to the embodiment.

In the step S103, if it is determined that the driver has no deceleration intention towards the target position (the step S103: No), the deceleration arbitration device 15 starts to reduce the system deceleration (refer to a dashed line in FIG. 3A) immediately after a time point t0 at which the driver steps on the brake pedal, as illustrated in FIG. 3A. The deceleration arbitration device 15 arithmetically operates the target acceleration/deceleration associated with the vehicle 1, on the basis of the system deceleration and the driver deceleration (refer to a solid line in FIG. 3A) (step S105). The speed controller 16 controls the deceleration of the vehicle 1 so as to realize the target acceleration/deceleration arithmetically operated by the deceleration arbitration device 15 (step S106).

Figure 3B:
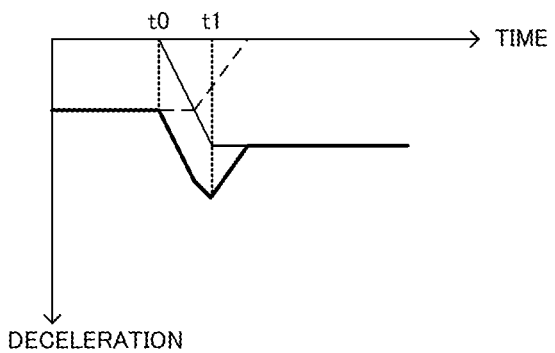
FIG. 3B is a graph illustrating the arbitration method according to the embodiment.

In the step S103, if it is determined that the driver has the deceleration intention towards the target position (the step S103: Yes), as illustrated in FIG. 3B, the deceleration arbitration device 15 starts to reduce the system deceleration later than the timing of the start of reducing the system deceleration in FIG. 3A. As a result, if it is determined that the driver has the deceleration, intention towards the target position, the timing in which the system deceleration becomes zero is delayed in comparison with when it is determined that the driver has no deceleration intention towards the target position. As described above, in the embodiment, if it is determined that the driver has the deceleration intention towards the target position, the method of arbitrating between the system deceleration and the driver deceleration when the deceleration assistance control is released, is changed from the method when it is determined that the driver has no deceleration intention towards the target position (step S104).

(Technical Effect)

In FIG. 3A, an increasing gradient of the driver deceleration from the time point t0 to a time point t1 (refer to a thin solid line in FIG. 3A) is higher than that of the deceleration corresponding to the target acceleration/deceleration (refer to a thick solid line in FIG. 3A). Thus, the driver feels the so-called G loosing, relatively highly likely. This occurs, however, when it is determined that the driver has no deceleration intention towards the target position. Thus, even if the driver feels the so-called G loosing, it is considered not to influence the driver's driving operation.

On the other hand, in FIG. 3B, the increasing gradient of the driver deceleration from the time point t0 to the time point t1 (refer to a thin solid line in FIG. 3B) is similar to that of the deceleration corresponding to the target acceleration/deceleration (refer to a thick solid line in FIG. 3B). The deceleration slightly decreases after the time point t1, but the driver feels the so-called G loosing less likely than when it is determined that the driver has no deceleration intention towards the target position (refer to FIG. 3A). In other words, on the driving assistance apparatus 100, the method of arbitrating between the system deceleration and the driver deceleration when the deceleration assistance control is released, is changed when it is determined that the driver has the deceleration intention towards the target position. It is thus possible to prevent the driver from feeling the G loosing. As a result, it can be expected that the driver operates the brake pedal, thereby to stop the vehicle 1 at the target position.

First Modified Example

Figure 4:
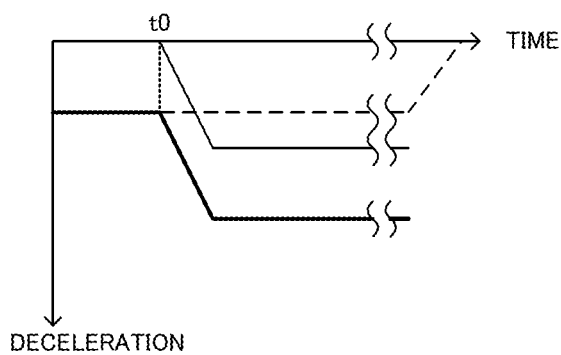
FIG. 4 is a graph illustrating an arbitration method according to a first modified example.

In the step S103 described above, if it is determined that the driver has the deceleration intention towards the target position (the step S103: Yes), it may be determined, as occasion demands, to what extent the start of reducing the system deceleration is delayed in comparison with when it is determined that the driver has no deceleration intention towards the target position. For example, as illustrated in FIG. 4, the system deceleration may start to be reduced significantly late in comparison with when it is determined that the driver has no deceleration intention towards the target position (the step S103: No). In this case, substantially, the driver deceleration is added to the system deceleration.

For an index for determining to what extent the start of reducing the system deceleration is delayed in comparison with when it is determined that the driver has no deceleration intention towards the target position, for example, a decreasing gradient of the driver deceleration is exemplified. In other words, in the step S103, if it is determined that the driver has the deceleration intention towards the target position (the step S103: Yes), the deceleration arbitration device 15 may delay the start of reducing the system deceleration when the driver deceleration has a high decreasing gradient of the driver deceleration, in comparison with when the driver deceleration has a low decreasing gradient of the driver deceleration.

For example, if the driver steps on the brake pedal due to a sudden change in behavior of another vehicle, which is a target of the deceleration assistance control, it is predicted that the decreasing gradient of the driver deceleration becomes relatively high. In this case, it is desirable to arbitrate between the system deceleration and the driver deceleration so that the driver deceleration is added to the system deceleration it is because relatively large deceleration is generated in the vehicle 1.

Second Modified Example

Figure 5:
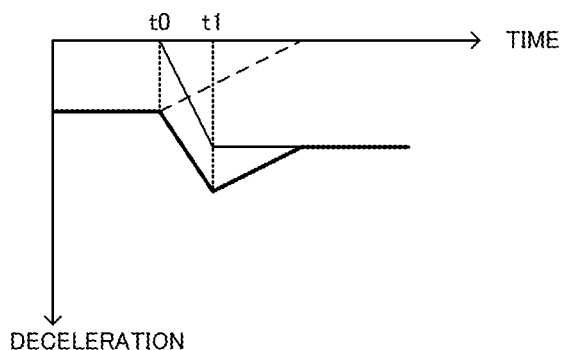
FIG. 5 is a graph illustrating an arbitration method according to a second modified example.

In the step S103 described above, if it is determined that the driver has the deceleration intention towards the target position (the step S103: Yes), the deceleration arbitration device 15 may also reduce a decreasing gradient of the system deceleration in comparison with when it is determined that the driver has no deceleration intention towards the target position, as illustrated in FIG. 5. Even in this case, if it is determined that the driver has the deceleration intention towards the target position, the timing in which the system, deceleration becomes zero is delayed in, comparison with when it is determined that the driver has no deceleration intention towards the target position.

In FIG. 5, the increasing gradient of the driver deceleration from the time point t0 to the time point t1 (refer to a thin solid line in FIG. 5) is similar to that of the deceleration corresponding to the target acceleration/deceleration (refer to a thick solid line in FIG. 5). The deceleration corresponding to the target acceleration/deceleration slightly decreases after the time point t1, but the driver feels the so-called G loosing less likely than when it is determined that the driver has no deceleration intention towards the target position. Therefore, even in this case, it is possible to prevent the driver from feeling the G loosing.

The decreasing gradient of the system deceleration may not be constant. In other words, if it is determined that the driver has the deceleration intention towards the target position, as long as the timing in which the system deceleration becomes zero is delayed in comparison with when it is determined that the driver has no deceleration intention towards the target position, for example, the decreasing gradient of the system deceleration in a part of a period in which the system deceleration is reduced (hereinafter referred to as a system deceleration reduction period) may be reduced in comparison with when it is determined that the driver has no deceleration intention towards the target position, and the decreasing gradient of the system deceleration in another period may be unchanged from when it is determined that the driver has no deceleration intention towards the target position.

Third Modified Example

In the step S103 described above, if it is determined that the driver has the deceleration intention towards the target position (the step S103: Yes), the deceleration arbitration device 15 may also change the decreasing gradient of the system deceleration in the system deceleration reduction period. Even in this case, if it is determined that the driver has the deceleration intention towards the target position, the decreasing gradient of the system deceleration may be changed so as to delay the timing in which the system deceleration becomes zero in comparison with when it is determined that the driver has no deceleration intention towards the target position.

Figure 6:
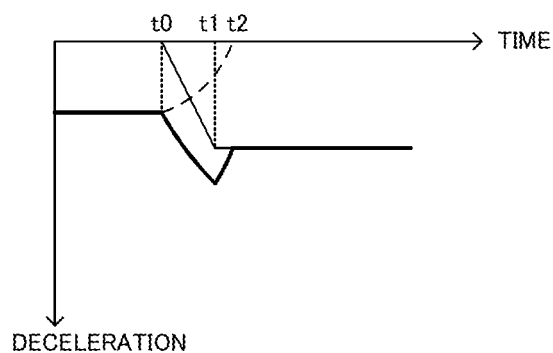
FIG. 6 is a graph illustrating an arbitration method according to a third modified example.

Specifically, for example, as illustrated in FIG. 6, the decreasing gradient of the system deceleration may be reduced by a first time length of the system deceleration reduction period (i.e., a period from the time point t0 to a time point t2 in FIG. 6) from the beginning thereof, in comparison with when it is determined that the driver has no deceleration intention towards the target position. Moreover, after a lapse of the first time length, the decreasing gradient of the system deceleration may be increased by a second time length in comparison with when it is determined that the driver has no deceleration intention towards the target position.

As illustrated in FIG. 6, for a while from the beginning of the period from the time point t0 to the time point t2, the increasing gradient of the driver deceleration from the time point t0 to the time point t1 (refer to a thin solid line in FIG. 6) is similar to that of the deceleration corresponding to the target acceleration/deceleration (refer to a thick solid line in FIG. 6). Thus, the driver feels the so-called G loosing less likely than when it is determined that the driver has no deceleration intention towards the target position. Therefore, even in this case, it is possible to prevent the driver from feeling the G loosing.

The decreasing gradient of the system deceleration nay be changed so that the timing in which the system deceleration becomes zero is unchanged (or the same) (i.e., so that the system deceleration becomes zero at the time point t1 in FIG. 6) both when it is determined that the driver has the deceleration intention towards the target position and when it is determined that the driver has no deceleration intention towards the target position.

Fourth Modified Example

Figure 7A:
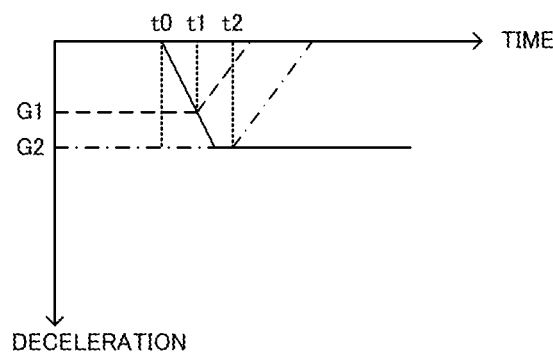
FIG. 7A is a graph illustrating an arbitration method according to a fourth modified example.

In the step S103 described above, if it is determined that the driver has the deceleration intention towards the target position (the step S103: Yes) and if the start of reducing the system deceleration is delayed in comparison, with when it is determined that the driver has no deceleration intention towards the target position, then, the deceleration arbitration device 15 may determine the timing of the start of reducing the system deceleration, on the basis of a magnitude of the system deceleration obtained before the time point t0. Specifically, as illustrated in FIG. 7A, if the system deceleration has a magnitude of G2 before the time point t0 (refer to an alternate long and short dash line in FIG. 7A), the deceleration arbitration device 15 may delay the timing of the start of reducing the system deceleration in comparison with when the system deceleration has a magnitude of G1 before the time point t0 (refer to a dashed line in FIG. 7A).

Figure 7B:
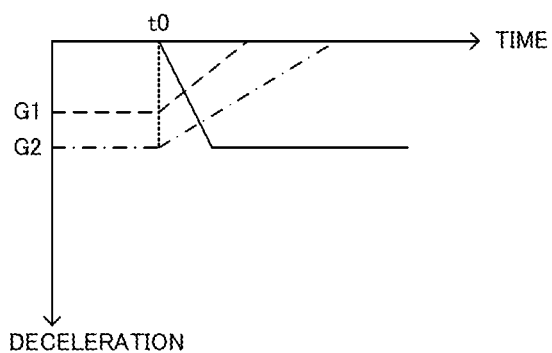
FIG. 7B is a graph illustrating the arbitration method according to the fourth modified example.

Alternatively, in the step S103 described above, if it is determined that the driver has the deceleration intention towards the target position (the step S103: Yes) and if the decreasing gradient of the system deceleration is reduced in comparison with when it is determined that the driver has no deceleration intention towards the target position, then, the deceleration arbitration device 15 may determine the decreasing gradient of the system deceleration on the basis of the magnitude of the system deceleration obtained before the time point t0. Specifically as illustrated in FIG. 7B, if the system deceleration has a magnitude of G2 before the time point t0 (refer to an alternate long, and short dash line in FIG. 7B), the deceleration arbitration device 15 may reduce the decreasing gradient of the system deceleration in comparison with when the system deceleration has a magnitude of G1 before the time point t0 (refer to a dashed line in FIG. 7B).

Fifth Modified Example

In the step S103 described above, if it is determined that the driver has the deceleration intention towards the target position (the step S103: Yes), the deceleration arbitration device 15 may delay the start of reducing the system deceleration in comparison with when it is determined the driver has no deceleration intention towards the target position, and the deceleration arbitration device 15 may reduce the decreasing gradient of the system deceleration in comparison with when it is determined that the driver has no deceleration intention towards the target position.

Sixth Modified Example

In the step S103 described, above, if it is determined that the driver has the deceleration intention towards the target position (the step S103: Yes), the deceleration arbitration device 15 may advance the timing of releasing the deceleration assistance control (i.e., the timing in which the system deceleration becomes zero) when the target of the deceleration assistance control is something that does not collide with the vehicle 1 (e.g., a red light, a stop line corresponding to a stop sign, etc.), in comparison with when the target is something that possibly collides with the vehicle 1 (e.g., another vehicle, etc.). In this case, however, the timing of ending the deceleration assistance control is late, in comparison with when it is determined that the driver has no deceleration intention towards the target position.

In other words, in the step S103, if it is determined that the driver has the deceleration intention towards the target position (the step S103: Yes), the deceleration arbitration device 15 may delay the timing of releasing the deceleration assistance control when the target of the deceleration assistance control is something that possibly collides with the vehicle 1, in comparison with when the target is something that does not collide with the vehicle 1.

If the target of the deceleration assistance control is something that does not collide with the vehicle 1, this allows a relatively high allowable value associated with a deviation from the target position of the stop position of the vehicle 1 caused by the so-called G loosing. On the other hand, if the target of the deceleration assistance control is something that possibly collides with the vehicle 1, this allows a relatively low allowable value associated with the deviation from the target position of the stop position of the vehicle 1 caused by the so-called G loosing. By virtue of the configuration as described above, if the target of the deceleration assistance control is something that does not collide with the vehicle 1, the deceleration assistance control can be released relatively early. Moreover, if the target of the deceleration assistance control is something that possibly collides with the vehicle 1, it can be expected that the so-called G loosing is prevented and that the vehicle 1 is stopped at the target position visualized by the driver.

Various aspects of embodiments of the present disclosure derived from the embodiment and modified examples explained above will be explained hereinafter.

A driving assistance apparatus according to an aspect of embodiments of the present disclosure is a driving assistance apparatus configured to provide deceleration assistance of decelerating a host vehicle when a predetermined assistance condition including requirements associated with a target, which is ahead of the host vehicle on a course thereof, is satisfied, and configured to end the deceleration assistance on condition that a pedal operation is performed by a driver of the host vehicle while the deceleration assistance is provided, the driving assistance apparatus provided with: an estimator configured to estimate an operation intention of the driver associated with an operation of a brake pedal, on condition that the brake pedal is operated by the driver while the deceleration assistance is provided; and a controller programmed to delay timing in which a deceleration assistance amount associated with the deceleration assistance becomes zero at the end of the deceleration assistance, if the estimated operation intention is caused by the target, in comparison with that if the estimated operation intention is not caused by the target. In the aforementioned embodiment, the intention determination device 14 corresponds to an example of the estimator, and the deceleration arbitration device 15 corresponds to an example of the controller.

If the driver operates the brake pedal while the deceleration assistance is provided, the deceleration assistance is ended. Thus, the deceleration assistance amount associated with the deceleration assistance decreases, whereas the deceleration caused by the operation of the brake pedal increases. At this time, a change in the deceleration actually generated in the host vehicle may be less than a change in the deceleration generated in the host vehicle that is expected by the driver from the operation amount (i.e., the step amount) of the brake pedal. In other words, if the driver operates the brake pedal while the deceleration assistance is provided, the driver may feel the so-called G loosing because the deceleration assistance is ended.

The driver's feeling of so-called G loosing is not a problem in many cases; however, for example, while the deceleration assistance is provided due to the target ahead of the host vehicle on the course thereof, in some cases, the driver recognizes the target and operates the brake pedal so as to stop the host vehicle at a stop target position (e.g., a stop line, etc.) corresponding to the target (i.e., so as to increase the deceleration, when the deceleration of the host vehicle caused by the deceleration assistance is less than the deceleration expected by the driver. At this time, if the driver feels the so-called G loosing, there may be a situation in which the host vehicle cannot be stopped at the target position. Specifically, for example, if the driver feels that it is hardly possible to stop the host vehicle at the target position due to the so-called G loosing and further steps on the brake pedal, then, the host vehicle ends up decelerating more than necessary. This may make it impossible to stop the host vehicle at the target position.

On the driving assistance apparatus, the operation intention of the driver associated with the operation of the brake pedal is estimated by the estimator, on condition that the brake pedal is operated by the driver while the deceleration assistance is provided. Then, the timing in which the deceleration assistance amount becomes zero at the end of the deceleration assistance (i.e., the timing of ending the deceleration assistance) is delayed by the controller, if the operation intention is caused by the target, in other words, if the driver is estimated to visualize the stop target position corresponding to the target, in comparison with when the operation intention is not caused by the target.

If the timing in which the deceleration assistance amount becomes zero is delayed, a difference is small between the change in the deceleration generated in the host vehicle that is expected by the driver from the operation amount of the brake pedal and the change in the deceleration actually generated in the host, vehicle. In other words, it is possible to prevent the driver from feeling the so-called G loosing by delaying the timing in which the deceleration assistance amount becomes zero. Therefore, according to the driving assistance apparatus, it is possible to prevent the driver from feeling discomfort when the deceleration assistance is ended due to the operation of the brake pedal by the driver. As a result, it can be expected that the host vehicle is stopped at the target position visualized by the driver even when the deceleration assistance is ended due to the operation of the brake pedal by the driver.

In an aspect of the driving assistance apparatus, the estimator is configured to estimate that the operation intention of the driver is caused by the target, if the brake pedal is operated while the deceleration assistance is provided and when a distance between the host vehicle and the target is less than a predetermined distance. According to this aspect, it is possible to estimate whether or not the operation intention of the driver is caused by the target, relatively easily.

The "predetermined distance" may be a value for determining whether or not the operation intention of the driver is caused by the target, and may be set as a fixed value, or as a variable value corresponding to some physical quantity or parameters. The "predetermined distance" may be set as follows: for example, obtaining a relation between (i) the distance between the host vehicle and the target, and (ii) a degree of awareness of the driver about the target, and setting it, on the basis of the obtained relation, as a distance at which the degree of awareness of the driver about the target is high enough to estimate that it is reflected or appears in the driving operation of the driver. The "second predetermined distance" in the aforementioned embodiment corresponds to an example of the "predetermined distance".

In another aspect of the driving assistance apparatus, the controller is programmed to delay the timing in which the deceleration assistance amount becomes zero at the end of the deceleration assistance, by lengthening a time from when the brake pedal is operated to when the deceleration assistance amount starts to be reduced, if the estimated operation intention is caused by the target, in comparison with that if the estimated operation intention is not caused by the target. According to this aspect, it is possible to delay the timing in which the deceleration assistance amount becomes zero at the end of the deceleration assistance, relatively easily.

In this aspect, the controller may be programmed to lengthen the time if a first deceleration assistance amount is large, in comparison with that if the first deceleration assistance amount is small, wherein the first deceleration assistance amount is the deceleration assistance amount obtained before a time point at which the brake pedal is operated by the driver in a period in which the deceleration assistance is provided. If the first deceleration assistance amount is large, the driver feels the so-called G loosing more likely than when the first deceleration assistance amount is small, which has been found by the present inventors. Therefore, by virtue of such a configuration, it is possible to appropriately prevent the driver from feeling the so-called G loosing.

In another aspect of the driving assistance apparatus, the controller is programmed to delay the timing in which the deceleration assistance amount becomes zero at the end of the deceleration assistance, by reducing a decreasing gradient of the deceleration assistance amount at least in a partial period at the end of the deceleration assistance, if the estimated operation intention is caused by the target, in comparison with that if the estimated operation intention is not caused by the target. According to this aspect, it is possible to delay the timing in which the deceleration assistance amount becomes zero at the end of the deceleration assistance, relatively easily.

In this aspect, the controller may be programmed to reduce the decreasing gradient if a second deceleration assistance amount is large, in comparison with that if the second deceleration assistance amount is small, wherein the second deceleration assistance amount is the deceleration assistance amount obtained before a time point at which the brake pedal is operated by the driver in a period in which the deceleration assistance is provided. If the second deceleration assistance amount is large, the driver feels the so-called G loosing more likely than when the second deceleration assistance amount is small, which has been found by the present inventors. Therefore, by virtue of such a configuration, it is possible to appropriately prevent the driver from feeling the so-called G loosing.

The present disclosure may be embodied in other specific forms without departing from the spirit or essential characteristics thereof. The present embodiments and examples are therefore to be considered all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to:
   provide deceleration assistance of decelerating a host vehicle when a predetermined assistance condition including requirements associated with a target, which is ahead of the host vehicle on a course thereof, is satisfied while a driver of the host vehicle does not operate an accelerator pedal or a brake pedal;
   end the deceleration assistance on condition that the driver operates the accelerator pedal or the brake pedal while the deceleration assistance is provided;
   estimate an operation intention of the driver associated with an operation of a brake pedal, on condition that the brake pedal is operated by the driver while the deceleration assistance is provided; and
   delay a timing when the deceleration assistance is ended, if the estimated operation intention of the driver is caused by the target, in comparison with the timing when the deceleration assistance is ended if the estimated operation intention of the driver is not caused by the target.

2. The driving assistance apparatus according to claim 1, further configured to:
   estimate that the operation intention of the driver is caused by the target, if the brake pedal is operated while the deceleration assistance is provided and when a distance between the host vehicle and the target is less than a predetermined distance.

3. The driving assistance apparatus according to claim 1, further configured to:
   delay the timing when the deceleration assistance is ended by lengthening a time from when the brake pedal is operated by the driver to when a deceleration assistance amount associated with the deceleration assistance starts to be reduced, if the estimated operation intention of the driver is caused by the target, in comparison with the time from when the brake pedal is operated by the driver to when the deceleration assistance amount starts to be reduced, if the estimated operation intention is not caused by the target.

4. The driving assistance apparatus according to claim 3, further configured to:
   lengthen the time from when the brake pedal is operated by the driver to when the deceleration assistance amount starts to be reduced if a first deceleration assistance amount associated with the deceleration assistance is large, in comparison with the time from when the brake pedal is operated by the driver to when the deceleration assistance amount starts to be reduced if the first deceleration assistance amount associated with the deceleration assistance is small, wherein the first deceleration assistance amount is a deceleration assistance amount associated with the deceleration assistance obtained before a time point at which the brake pedal is operated by the driver in a period in which the deceleration assistance is provided.

5. The driving assistance apparatus according to claim 1, further configured to:
   delay the timing when the deceleration assistance is ended by reducing a gradient indicating a rate at which a deceleration assistance amount associated with the deceleration assistance is decreased, at least in a partial period at the end of a time period when deceleration assistance is provided, if the estimated operation intention of the driver is caused by the target, in comparison with the gradient indicating the rate at which the deceleration assistance amount associated with the deceleration assistance is decreased if the estimated operation intention of the driver is not caused by the target.

6. The driving assistance apparatus according to claim 5, further configured to:
   reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

7. The driving assistance apparatus according to claim 2, further configured to:
   delay the timing when the deceleration assistance amount is ended by lengthening a time from when the brake pedal is operated by the driver to when a deceleration assistance amount associated with the deceleration assistance starts to be reduced, if the estimated operation intention of the driver is caused by the target, in comparison with the time from when the brake pedal is operated by the driver to when the deceleration assistance amount starts to be reduced, if the estimated operation intention of the driver is not caused by the target.

8. The driving assistance apparatus according to claim 7, further configured to:
   lengthen the time from when the brake pedal is operated by the driver to when the deceleration assistance amount starts to be reduced if a first deceleration assistance amount is large, in comparison with the time from when the brake pedal is operated by the driver to when the deceleration assistance amount starts to be reduced if the first deceleration assistance amount is small, wherein the first deceleration assistance amount is a deceleration assistance amount associated with the deceleration assistance obtained before a time point at which the brake pedal is operated by the driver in a period in which the deceleration assistance is provided.

9. The driving assistance apparatus according to claim 2, further configured to:
    delay the timing when the deceleration assistance is ended by reducing a gradient indicating a rate at which a deceleration assistance amount associated with the deceleration assistance is reduced, at least in a partial period at the end of a time period when the deceleration assistance is provided, if the estimated operation intention of the driver is caused by the target, in comparison with the gradient if the estimated operation intention of the driver is not caused by the target.

10. The driving assistance apparatus according to claim 9, further configured to:
    reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

11. The driving assistance apparatus according to claim 3, further configured to:
    delay the timing in which when the deceleration assistance is ended by reducing a gradient indicating a rate at which a deceleration assistance amount associated with the deceleration assistance is reduced, at least in a partial period at the end of a time period when the deceleration assistance is provided, if the estimated operation intention of the driver is caused by the target, in comparison with the gradient if the estimated operation intention of the driver is not caused by the target.

12. The driving assistance apparatus according to claim 11, further configured to:
    reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

13. The driving assistance apparatus according to claim 4, further configured to:
    delay the timing when the deceleration assistance is ended by reducing a gradient indicating a rate at which a deceleration assistance amount associated with the deceleration assistance is reduced, at least in a partial period at the end of a time period when the deceleration assistance is provided, if the estimated operation intention of the driver is caused by the target, in comparison with the gradient if the estimated operation intention of the driver is not caused by the target.

14. The driving assistance apparatus according to claim 13, further configured to:
    reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

15. The driving assistance apparatus according to claim 7, further configured to:
    delay the timing when the deceleration assistance is ended by reducing a gradient indicating a rate at which a deceleration assistance amount associated with the deceleration assistance is reduced, at least in a partial period at the end of a time period when the deceleration assistance is provided, if the estimated operation intention of the driver is caused by the target, in comparison with the gradient if the estimated operation intention of the driver is not caused by the target.

16. The driving assistance apparatus according to claim 15, further configured to:
    reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

17. The driving assistance apparatus according to claim 8, further configured to:
    delay the timing when the deceleration assistance is ended by reducing a gradient indicating a rate at which a deceleration assistance amount associated with the deceleration assistance is reduced, at least in a partial period at the end of a time period when the deceleration assistance is provided, if the estimated operation intention of the driver is caused by the target, in comparison with the gradient if the estimated operation intention of the driver is not caused by the target.

18. The driving assistance apparatus according to claim 17, further configured to:
    reduce the gradient if a second deceleration assistance amount is large, in comparison with the gradient if the second deceleration assistance amount is small, wherein the second deceleration assistance amount is a deceleration assistance amount associated with the deceleration assistance obtained before a time point at which the brake pedal is operated by the driver in a period in which the deceleration assistance is provided.

* * * * *